US008935680B2

(12) United States Patent
Guarnieri et al.

(10) Patent No.: US 8,935,680 B2
(45) Date of Patent: Jan. 13, 2015

(54) DIFFERENTIAL STATIC PROGRAM ANALYSIS

(71) Applicant: International Business Machines Corporation, Armonk, NY (US)

(72) Inventors: Salvatore A. Guarnieri, New York, NY (US); Omer Tripp, Har-Adar (IL); Marco Pistoia, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 13/673,419

(22) Filed: Nov. 9, 2012

(65) Prior Publication Data

US 2014/0115563 A1     Apr. 24, 2014

Related U.S. Application Data

(63) Continuation of application No. 13/656,244, filed on Oct. 19, 2012.

(51) Int. Cl.
*G06F 9/45*     (2006.01)

(52) U.S. Cl.
USPC ............................ 717/143; 717/140; 717/153

(58) Field of Classification Search
CPC ....... G06F 8/41; G06F 8/447; G06F 9/45516; G06F 8/443; G06F 8/71; G06F 9/45504; G06F 9/445; G06F 9/443
See application file for complete search history.

(56) References Cited

U.S. PATENT DOCUMENTS

| | | | |
|---|---|---|---|
| 8,365,147 B2 * | 1/2013 | Grechanik et al. | ............ 717/124 |
| 8,458,662 B2 * | 6/2013 | Grechanik et al. | ............ 717/124 |
| 2008/0244239 A1 | 10/2008 | DeWitt et al. | |
| 2011/0067006 A1 | 3/2011 | Baker et al. | |
| 2011/0258609 A1 | 10/2011 | Maczuba | |
| 2012/0066378 A1 | 3/2012 | Lui et al. | |

FOREIGN PATENT DOCUMENTS

| | | |
|---|---|---|
| CN | 102082659 A | 6/2011 |
| WO | W09857260 A1 | 12/1998 |

OTHER PUBLICATIONS

Futcher, L., et al. "Guidelines for Secure Software Development" Proceedings of the 2008 Annual Conference of the South African Institute of Computer Scientists and Information Technologists on IT Research in Developing Countries (SAICSIT 2008). Oct. 2008. pp. 56-65.

* cited by examiner

*Primary Examiner* — Chuck Kendall
(74) *Attorney, Agent, or Firm* — Tutunjian & Bitetto, P.C.; Anne V. Dougherty

(57) ABSTRACT

Systems for program analysis include a high-level scanning tool configured to perform a high-level analysis on a program using a processor to generate one or more high-level findings; one or more low-level scanning tools, each configured to perform a low-level analysis on the program using a processor to generate a low-level finding; and a mapping module configured to map the one or more low-level findings to the high-level findings to generate a concise combination report that categorizes each finding according to the highest-level analysis that produces the finding.

17 Claims, 2 Drawing Sheets

DIFFERENTIAL STATIC PROGRAM ANALYSIS

RELATED APPLICATION INFORMATION

This application is a Continuation application of copending U.S. patent application Ser. No. 13/656,244 filed on Oct. 19, 2012, incorporated herein by reference in its entirety.

BACKGROUND

1. Technical Field

The present invention relates to static code analysis and, more particularly, to using multiple analyses with differing levels of precision to make static analysis reports more useful.

2. Description of the Related Art

Static code analysis is a powerful approach for software verification. Static analysis typically features one-sided error: a subject program is safe with regard to the tested property if no violations of the property are discovered by the analysis, which over-approximates the program's set of possible behaviors. However, if the analysis does report violations of the property, then that doesn't necessarily imply that the program is incorrect. These violations may be false reports due to the approximations the analysis applies to put bounds on the state space of the program, which could otherwise be infinite.

Since the tested properties are mostly hard to verify statically (e.g., security vulnerabilities, concurrency bugs, typestate violations, etc.), static analysis tools typically have a high proportion of false reports. For example, commercial static security tools—such as IBM Rational AppScan Source Edition and HP Fortify 360—would report about 10,000 vulnerabilities on a program containing 100,000 LOC. This limits the usability of commercial analysis tools: The size of the report, together with the poor quality of many of the findings, makes it difficult to translate the report into an actionable list of remediation tasks.

SUMMARY

A method for program analysis is shown that includes performing a high-level analysis on a program using a processor to generate one or more high-level findings; performing one or more low-level analyses on the program using a processor to generate one or more low-level findings; and mapping the one or more low-level findings to the high-level findings to generate a concise combination report that categorizes each finding according to the highest-level analysis that produces the finding.

A method for program analysis is shown that includes performing a high-level analysis on a program using a processor to generate one or more high-level findings; performing one or more low-level analyses on the program using a processor to generate one or more low-level findings; mapping the one or more low-level findings to the high-level findings to generate a concise combination report that displays results associated with the analyses such that high-level findings are grouped together and suppressed in information relating to low-level reports; and linking analyses in the combination report to associate a suppressed finding in a first analysis with a full report on the finding in a second analysis.

A method for program analysis is shown that includes performing a high-level analysis on a program using a processor to generate one or more high-level findings; performing one or more low-level analyses on the program using a processor to generate one or more low-level findings; mapping the one or more low-level findings to the high-level findings to generate a concise combination report that displays results associated with the analyses such that high-level findings are grouped together and suppressed in information relating to low-level reports; and linking analyses in the combination report to associate a suppressed finding in a first analysis with a full report on the finding in a second analysis. Mapping includes generating a set that combines all of the high-level and low-level findings; removing from the set any findings that were generated by an analysis having a higher associated level of precision than an analysis in question; associating the set of remaining findings with the analysis in question; and repeating said generating, removing, and associating for each analysis.

A system for program analysis is shown that includes a high-level scanning tool configured to perform a high-level analysis on a program using a processor to generate one or more high-level findings; one or more low-level scanning tools, each configured to perform a low-level analysis on the program using a processor to generate a low-level finding; a mapping module configured to map the one or more low-level findings to the high-level findings to generate a concise combination report that categorizes each finding according to the highest-level analysis that produces the finding.

A system for program analysis is shown that includes a high-level scanning tool configured to perform a high-level analysis on a program using a processor to generate one or more high-level findings; one or more low-level scanning tools, each configured to perform a low-level analysis on the program using a processor to generate a low-level finding; a mapping module configured to map the one or more low-level findings to the high-level findings to generate a concise combination report that displays results associated with the analyses such that high-level findings are grouped together and suppressed in information relating to low-level reports; and a report module configured to link analyses in the combination report to associate a suppressed finding in a first analysis with a full report on the finding in a second analysis.

A system for program analysis is shown that includes a high-level scanning too configured to perform a high-level analysis on a program using a processor to generate one or more high-level findings; one or more low-level scanning tools, each configured to perform a low-level analysis on the program using a processor to generate a low-level finding; a mapping module configured to map the one or more low-level findings to the high-level findings to generate a concise combination report that displays results associated with the analyses, such that high-level findings are grouped together and suppressed in information relating to low-level reports, to generate a set that combines all of the high-level and low-level findings, to remove from the set any findings that were generated by an analysis having a higher associated level of precision than an analysis in question, to associate the set of remaining findings with the analysis in question, and to repeat said generation, removal, and association for each analysis; and a report module configured to link analyses in the combination report to associate a suppressed finding in a first analysis with a full report on the finding in a second analysis.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
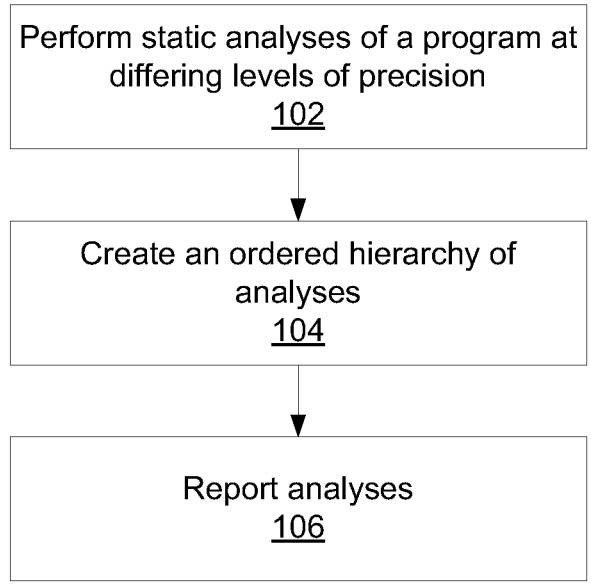
FIG. 1 is a block/flow diagram of a method for program analysis according to the present principles.

The present principles provide for a differential static analysis, where using multiple analyses of increasing granularity enables the reporting of fewer findings compared to using more fine-grained analyses. Moreover, each of the reported findings is reported at an intuitive level, making it easier for the analyst to take appropriate remediating action in response to discovered violations. By grouping together similar findings, the job of the human reviewer is made much simpler, as similar violations are listed in such a way as to make identifying root causes easier.

Static security analysis typically takes the form of taint analysis, where the analysis is parameterized by a set of security rules, each rule being a triple <Src, San, Snk>, where Src denotes source statements that read untrusted user inputs, San denotes downgrader statements that endorse untrusted data by validating and/or sanitizing it, and Snk denotes sink statements which perform security-sensitive operations. Given a security rule R, any flow from a source in $Src_R$ to a sink in $Snk_R$ that doesn't pass through a downgrader from $San_R$ comprises a potential vulnerability. This reduces security analysis to a graph reachability problem.

The below example code illustrates one instance where the present principles may improve the usefulness of static analysis.

```
static String tempUserName;
...
String name = request.getParameter("name"); // Source
if (tempUserName == null) {
    tempUserName = name; }
...
L1: tempUserName = null;
...
L2: if (tempUserName != null) {
    String userName = tempUserName; ...;
    DB.write(userName); // Sink }
DB.write(name); // Sink
```

In this example, which is taken from the domain of security analysis, an untrusted (e.g., user-provided) value is read by the request.getParameter statement. This represents a "Source" in the static analysis. This value then conditionally flows into a static variable, tempUserName, which conditionally flows into variable userName. The variable userName is an argument to a "Sink" statement, the database update operation DB.write. There is also a "direct" flow, where the variable "name" is passed directly to DB.write. In this case, the flow through the static variable tempUserName is likely to be spurious. The only scenario that would make tempUserName potentially vulnerable is if another thread sets tempUserName to an untrusted value between the execution of the statements at program labels L1 and L2.

Standard security analyses, based on data-flow reachability, would report both flows as being vulnerable. This output is suboptimal, however, because the analysis report becomes cluttered with "weak" issues. These weak issues, which are unlikely to reflect actual vulnerabilities in the program, reduce the quality of the report by making important issues harder to find and, consequently, more difficult to respond to. In the example code above this is not a dramatic concern, because there is only one spurious flow through the static tempUserName variable. In a real-world application, however, there would typically be a great many such flows reported.

Referring now to the drawings in which like numerals represent the same or similar elements and initially to FIG. 1, a high-level method for differential static program analysis is shown. Block 102 performs multiple static analyses of a given program at differing levels of precision, where differing levels of approximation are used. Generally, a less precise analysis will produce more false-positives. Block 104 creates an ordered hierarchy of analyses, from least to most precise and, for each consecutive pair of analyses, removes all findings from the more precise analysis that are also present in the less precise analysis. Alternatively, block 104 removes from a more precise analysis those violations that exist in any less precise finding. Block 106 then creates a report to the user detailing the findings. By only reporting violations at the lowest level of precision they occur, block 106 provides violation information in a manner that groups similar violations together and makes it easier to both ignore unimportant violations and determine a best course of action for important violations.

According to the present principles then, multiple coarse analyses may be run in conjunction with the data-flow analysis in block 102. For example, quality analyses can be run, which enforce recommended coding practices. Such a quality analysis on the above example code would flag the fact that vulnerable flows pass through a static variable. Such an analysis would not even perform interprocedural data-flow reachability analysis. Instead, it would flag a "coarse" finding on the very fact that tempUserName is used in a security-sensitive context. As a result, the more refined data-flow analysis could soundly suppress all flows involving tempUserName, knowing that these are grouped as a single finding by the more coarse analysis.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As noted above in block 102, multiple analyses may be performed at differing levels of precision. However, such analyses may not simply vary along a single precision variable. For example, while one scanning tool may focus on rule-based scanning, with precision varying with the number and strictness of the rules, a data-flow-based scanning tool will find an entirely different class of violations, such that the analyses of the two tools may not be directly comparable. However, this information may nonetheless be used to create mappings between the different tools. In this way, findings by, e.g., a rule-based scanner may be used to improve the reporting of findings from a flow-based scanner.

Figure 2:
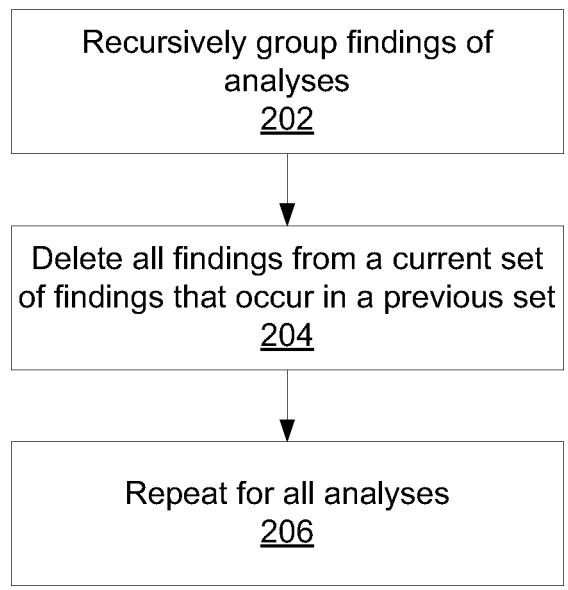
FIG. 2 is a block/flow diagram of a method for analysis mapping in a combination report according to the present principles.

Referring now to FIG. 2, a diagram providing greater detail on mapping findings between different scanning tools is shown. Block 202 groups analysis findings recursively. The set of findings $S_n$ mapped to a given analysis n is initialized in block 202 as $S_n = \cup_{i=1\ldots n} A_i$, where $A_n$ is the set of findings resulting from the analysis n. The analyses are ordered, such that n is less precise than n+1. Block 204 begins at the most precise analysis $A_n$ and the next less precise analysis $A_{n-1}$ and removes from $S_n$ all findings that are covered in $A_{n-1}$. Block 206 repeats this process for $S_{n-1}$, removing all findings that are covered in $A_{n-2}$. In this way, findings are mapped to the least precise analysis that they occur in.

In one embodiment, it is assumed that the scanning tools have a total order, such that $A_{i-1}$ is less precise than $A_i$ for all i. In such an embodiment, if a finding is reported by a more precise analysis, then that finding is mappable to a less precise analysis. In another embodiment, the scanning tools form a partially ordered set where, for example, $A_1$ is less precise than $A_3$ and $A_2$ is less precise than $A_3$, but there is no strict ordering between $A_1$ and $A_2$. In such an embodiment, one approach is to form the union of $A_1$ and $A_2$ and eliminate based on $A_3$. If no strict order can be established, an arbitrary order may be selected by any appropriate means. In the case of a partial ordering, where a violation is found at a nominally lower level but absent at a higher level, the violation is left associated with the highest-level analysis at which it occurs. It should be understood that a "high-level" analysis, as used herein, corresponds to a low precision analysis, while a "low-level" analysis corresponds to a high-precision analysis, such that a high-level analysis will be less precise than a low-level analysis.

Figure 3:
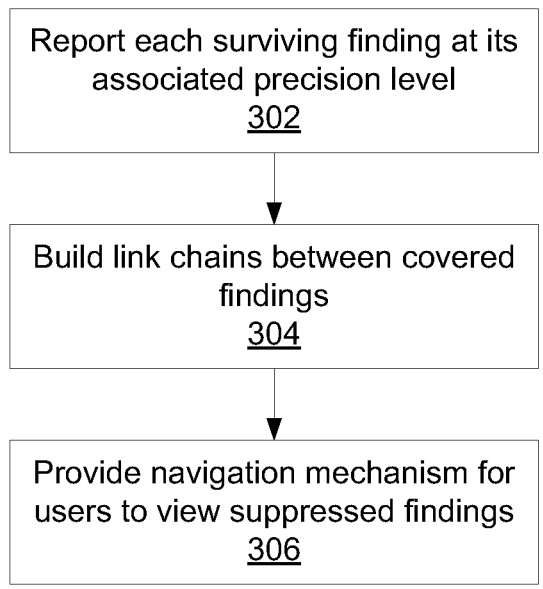
FIG. 3 is a block/flow diagram of building a combination report for high- and low-level analyses according to the present principles.

Referring now to FIG. 3, report generation is shown. After mapping is performed, as with FIG. 2 above, block 302 reports each surviving finding at its associated precision level. Block 304 builds links between findings in different analyses. For example, if a given finding f from $A_i$ is suppressed due to a finding f' of $A_{i-1}$, then block 304 links f' to f to enable a review of the suppressed finding. Block 306 then provides a navigation mechanism for users to view suppressed findings, such that following a link in a suppressed finding gives greater detail and context for that finding based on the linked level of analysis. This allows a user to more easily determine an appropriate action to take.

Figure 4:
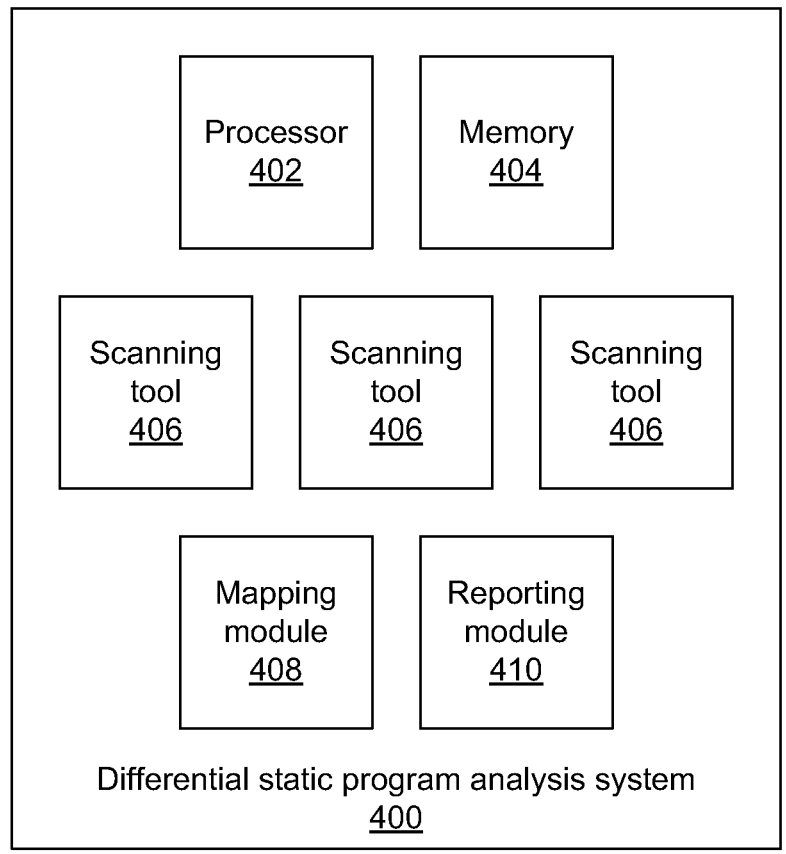
FIG. 4 is a diagram of a program analysis system according to the present principles.

Referring now to FIG. 4, a system 400 for differential static program analysis is shown. The system 400 includes a processor 402 and memory 404 and one or more scanning tools 406. The scanning tools 406 employ the processor 402 and memory 404 to scan a program under test to determine whether the program violates one or more properties. The scanning tools 406 may operate at differing levels of precision or according to different methodologies (e.g., rule-based or data-flow-based). The results of the scanning tools 406 are reviewed by mapping module which establishes mappings between particular violations and a most appropriate precision level, while reporting module 410 turns the mapped results into an intuitive, easy-to-use format for a user.

Having described preferred embodiments of a system and method for differential static program analysis (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for program analysis comprising:
a high-level scanning tool comprising a processor configured to perform a high-level analysis on a program to generate one or more high-level findings;
one or more low-level scanning tools, each configured to perform a low-level analysis on the program using the processor to generate a low-level finding;
a mapping module configured to map the one or more low-level findings to the high-level findings to generate a concise combination report that displays results associated with the analyses such that high-level findings are grouped together and suppressed in information relating to low-level reports; and
a report module configured to link analyses in the combination report to associate a suppressed finding in a first analysis with a full report on the finding in a second analysis.

2. The system of claim 1, wherein the mapping module is further configured to generate a set that combines all of the high-level and low-level findings, to remove from the set any findings that were generated by an analysis having a higher associated level of precision than an analysis in question, to associate the set of remaining findings with the analysis in question, and to repeat said generation, removal, and association for each analysis.

3. The system of claim 2, further comprising sorting the findings according to an associated level of precision.

4. The system of claim 1, wherein the high-level analysis is a rule-based analysis.

5. The system of claim 1, wherein the one or more low-level analyses are data-flow-based analyses.

6. The system of claim 1, wherein the one or more low-level analyses each have a different level of precision.

7. The system of claim 1, wherein the high-level analysis and the low-level analyses have a total order with respect to precision.

8. The system of claim 1, where the high-level analysis and the low-level analyses have a partial order with respect to precision.

9. A non-transitory computer readable storage medium comprising a computer readable program for program analysis, wherein the computer readable program when executed on a computer causes the computer to perform the steps of:
performing a high-level analysis on a program using a processor to generate one or more high-level findings;
performing one or more low-level analyses on the program using a processor to generate one or more low-level findings;
mapping the one or more low-level findings to the high-level findings to generate a concise combination report that displays results associated with the analyses such that high-level findings are grouped together and suppressed in information relating to low-level reports; and
linking analyses in the combination report to associated a suppressed finding in a first analysis with a full report on the finding in a second analysis.

10. A method for program analysis comprising:
performing a high-level analysis on a program using a processor to generate one or more high-level findings;
performing one or more low-level analyses on the program using a processor to generate one or more low-level findings;
mapping the one or more low-level findings to the high-level findings to generate a concise combination report that displays results associated with the analyses such that high-level findings are grouped together and suppressed in information relating to low-level reports; and
linking analyses in the combination report to associate a suppressed finding in a first analysis with a full report on the finding in a second analysis.

11. The method of claim 10, wherein mapping comprises:
generating a set that combines all of the high-level and low-level findings;
removing from the set any findings that were generated by an analysis having a higher associated level of precision than an analysis in question;
associating the set of remaining findings with the analysis in question; and
repeating said generating, removing, and associating for each analysis.

12. The method of claim 11, further comprising sorting the findings according to an associated level of precision.

13. The method of claim 10, wherein the high-level analysis is a rule-based analysis.

14. The method of claim 10, wherein the one or more low-level analyses are data-flow-based analyses.

15. The method of claim 10, wherein the one or more low-level analyses each have a different level of precision.

16. The method of claim 10, wherein the high-level analysis and the low-level analyses have a total order with respect to precision.

17. The method of claim 10, where the high-level analysis and the low-level analyses have a partial order with respect to precision.

* * * * *